(12) United States Patent
Imai et al.

(10) Patent No.: US 6,745,618 B2
(45) Date of Patent: Jun. 8, 2004

(54) SCANNING PROBE MICROSCOPE (75) Inventors: Yukari Imai, Tokyo (JP); Mari Tsugami, Tokyo (JP); Hitoshi Maeda, Tokyo (JP); Tohru Koyama, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/193,237

(22) Filed: Jul. 12, 2002

(65) Prior Publication Data
US 2003/0115939 A1 Jun. 26, 2003

(30) Foreign Application Priority Data

Dec. 25, 2001 (JP) ........................................ 2001-391484

(51) Int. Cl.$^7$ .............................. G01B 5/28; G01B 7/34; G01N 13/16
(52) U.S. Cl. .......................................... 73/105; 250/306
(58) Field of Search ............................. 73/105; 250/306

(56) References Cited

U.S. PATENT DOCUMENTS

| 5,406,833 A | * | 4/1995 | Yamamoto .................... 73/105 |
| 6,198,097 B1 | * | 3/2001 | Abbate et al. ............... 250/306 |
| 2002/0043101 A1 | * | 4/2002 | Naitou et al. .................. 73/105 |
| 2002/0157457 A1 | * | 10/2002 | Vandervorst et al. ......... 73/105 |

FOREIGN PATENT DOCUMENTS

| JP | 9-166603 | 6/1997 |
| JP | 10-267945 | 10/1998 |

OTHER PUBLICATIONS

Alexander, S. et al., "An Atomic–Resolution Atomic Force Microscope Implemented Using an Optical Lever" J. App. Phys., vol. 65, No. 1, Jan. 1, 1989, pp. 164–167.*

Denk, W. et al., "Local Electrical Dissipation Imaged by Scanning Force Microscopy" Appl. Phys. Lett., vol. 59, No. 17, Oct. 21, 1991, pp. 2171–2173.*

* cited by examiner

*Primary Examiner*—Daniel S. Larkin
(74) *Attorney, Agent, or Firm*—Oblon, Spivak, McClelland, Maier & Neustadt, P.C.

(57) ABSTRACT

A scanning probe microscope includes a laser diode (1$a$) as a light source for emitting light lower in energy level than band gap of semiconductor as a sample. Laser light (2) emitted therefrom should be of wavelength larger in value than a wavelength $\lambda$ calculated as follows:

$$\lambda = hc/Eg$$

where h is Planck's constant, c represents speed of light and Eg represents band gap. When the semiconductor as a sample is silicon, the band gap thereof is 1.12 eV, thus calculating the wavelength $\lambda$ at 1.107 $\mu$m. The laser diode (1$a$) should be such that the laser light (2) emitted therefrom is of wavelength larger in value than $\lambda$. It is therefore allowed to avoid emission of light higher in energy level than the band gap of silicon as a sample and eventually, avoid generation of photoelectric current in the sample.

1 Claim, 7 Drawing Sheets

SCANNING PROBE MICROSCOPE

BACKGROUND OF THE INVENTION

1. Field of the Invention

The present invention relates to a scanning probe microscope and a method of using the same.

2. Description of the Background Art

A scanning probe microscope (SPM) includes a scanning tunneling microscope (STM) and an atomic force microscope (AFM). The STM measures tunneling current flowing between a sample and a conductive probe and scans a region to be observed, thus forming an image of the region. The AFM measures atomic force interaction between the tip of a probe and a sample surface and scans a region to be observed, thus forming an image of the region.

According to the AFM, atomic force interaction between the tip of a probe fixed to the end of a plate spring (that is a so-called cantilever) and a sample surface is measured by the amount of deflection (displacement) of the cantilever. A sample surface is scanned by the cantilever. The image of the shape of the sample surface is thereby formed.

Several methods are known in AFM that are classified according to how displacement of a cantilever is detected. More particularly, they include an advanced STM method, an optical lever method, an optical interaction method and the like. According to the advanced STM method, a cantilever is arranged between a conductive probe of the STM and a conductive sample. Displacement of the cantilever is detected as a variation in tunneling current. According to the optical lever method, displacement of a cantilever is detected by a variation in angle of laser light reflected at the back of the cantilever. According to the optical interaction method, displacement of a cantilever is detected by measuring the amount of interaction between light reflected at the end face of an optical fiber arranged on the back of the cantilever and light reflected at the back of the cantilever. Among these, the optical lever is a dominating method in current AFMs.

Figure 12:
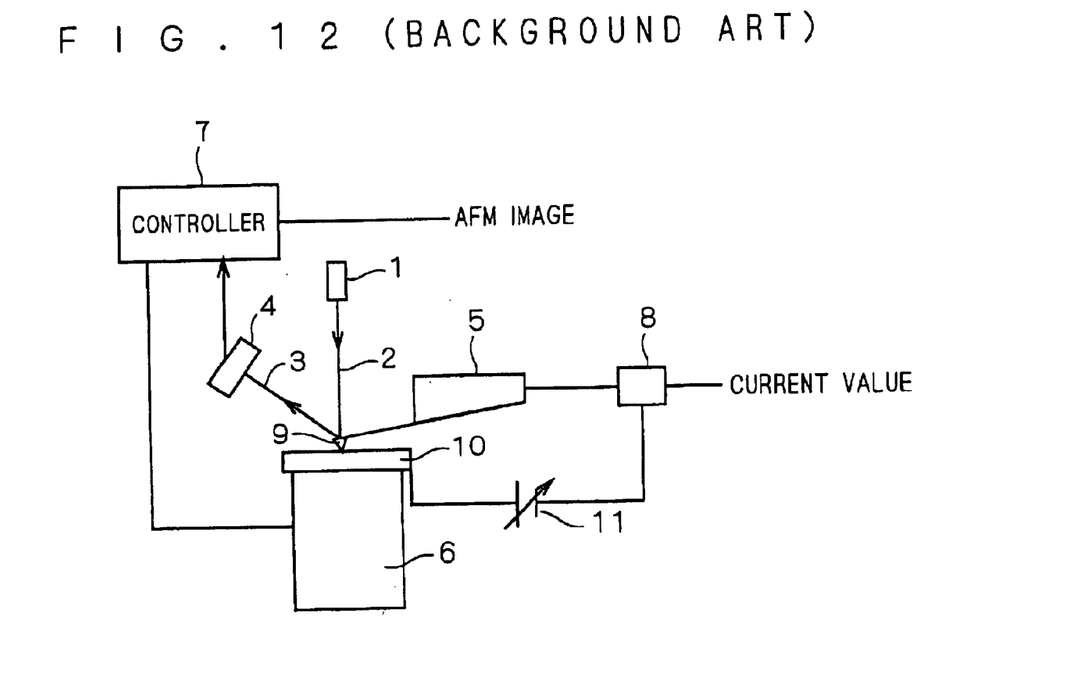
FIG. 12 is a diagram illustrating the structure of a background-art AFM.

FIG. 12 is a view illustrating the structure of an optical lever AFM. The AFM in FIG. 12 is an electron microscope allowing, in addition to observation of the shape of a sample surface, measurement of the sample by electrical characteristic.

With reference to FIG. 12, reference numeral 1 designates a laser diode, numeral 2 designates laser light emitted from the laser diode 1 and numeral 3 designates reflected laser light obtained by reflecting the light 2. Further, a reference numeral 4 designates a photodetector for detecting variation in angle of the reflected laser light 3 and numeral 5 designates a conductive cantilever for reflecting the laser light 2 at the back thereof. Still further, reference numeral 6 designates a piezoelectric actuator for moving a below-described stage mounted on the upper surface thereof in X, Y and Z directions.

Reference numeral 7 designates a controller for forming an AFM image and controlling the piezoelectric actuator 6, numeral 8 designates an amplifier for detecting and amplifying a value of current flowing between a sample and the conductive cantilever 5. Yet further, reference numeral 9 designates a probe fixed to the end of the conductive cantilever 5, numeral 10 designates a stage for holding the sample to be evaluated and numeral 11 designates a variable voltage source for applying voltage to the sample during measurement of the sample by electrical characteristic.

Using variation in angle of the reflected laser light 3 detected by the photodetector 4, the controller 7 calculates the amount of deflection of the conductive cantilever 5 and forms an AFM image. Namely, an image of a shape of the sample surface is formed. Further, the controller 7 controls the piezoelectric actuator 6 in feedback control in such a manner that the amount of deflection of the conductive cantilever 5 is always kept at a certain level. Formation of the AFM image and feedback control will be discussed in more detail as follows. That is, the piezoelectric actuator 6 is controlled to be displaced in a Z axis direction (vertical direction) such that the amount of deflection of the conductive cantilever 5 is kept at a certain level. The amount of surface roughness is detected by the amount of deflection of the actuator 6, thus allowing formation of the AFM image.

In addition to detection of atomic force interaction with the conductive cantilever 5 and the sample, the conductive cantilever 5 further detects the sample by electrical characteristic. Regarding the probe 9, in addition to detection of atomic force interaction with the sample, it also measures the sample by electrical characteristic as a conductive probe contacting the sample. Utilizing a conductive cantilever, surface roughness and electrical characteristic of the sample can be simultaneously measured.

For measurement of the sample by electrical characteristic, voltage is applied to the sample from the variable voltage source 11. A value of current flowing between the sample and the conductive cantilever 5 is detected and outputted by the amplifier 8.

When it is required to detect a defective point in a semiconductor device where current leakage occurs, for example, observing an image obtained by a microscope, leakage current is simultaneously measured in situ. The defective position suffering from leakage current is thereby identified on nanoscale and a current differential between the defective position and a normal position is determined, thus yielding a result such as estimation of the cause of the defect.

The AFM in FIG. 12 may experience leakage of the laser light 2 for measuring displacement of the conductive cantilever 5, which then impinges on the sample. In other cases, a portion of the reflected light 3 may undergo further reflection, thereafter impinging on the sample. Supposing that the sample is a semiconductor, photoelectric current may occur inside the sample in these cases, thus exerting influence on measurement of the sample by electrical characteristic. Such influence is troublesome especially when leakage current of minute amount generated in a semiconductor device should be measured. In this case, a value of leakage current cannot be measured with precision.

Figure 13:
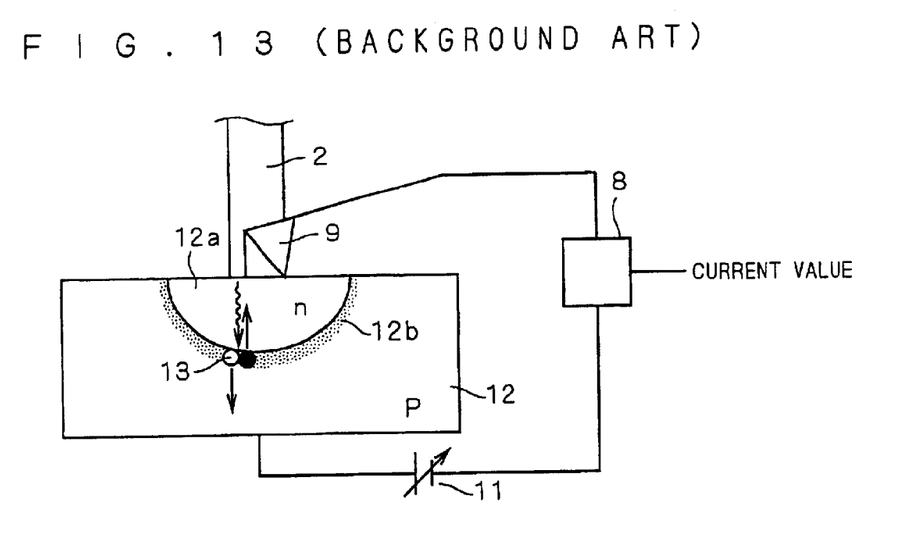
FIG. 13 is a diagram illustrating a photoelectric current generation model.

The foregoing problem is described according to a photoelectric current generation model in FIG. 13. With reference to FIG. 13, reference numeral 12 designates a semiconductor as a sample and numeral 13 designates an electron-hole pair generated due to leakage of the laser light 2 from the conductive cantilever 5. The semiconductor 12 includes a p-type semiconductor substrate holding an n-type region 12a formed therein, for example. For the sake of simplification, the stage 10 is omitted from FIG. 13.

When a depletion layer 12b created at a pn junction between the n-type region 12a and the p-type substrate is irradiated with the laser light 2, the electron-hole pair 13 is generated as illustrated in FIG. 13, thus generating photoelectric current. As described, photoelectric current thereby generated inhibits precise measurement of current developing inside the semiconductor device.

SUMMARY OF THE INVENTION

It is therefore an object of the present invention to provide a scanning probe microscope and a method of using the same preventing generation of photoelectric current in a sample due to laser light.

According to a first aspect of the present invention, the scanning probe microscope has a light source and a cantilever for detecting atomic force interaction with a sample. The scanning probe microscope induces light emitted from the light source to impinge on the cantilever and detects reflected light obtained therefrom, thus forming an image of a shape of a sample surface. The cantilever also serves as a probe for measuring the sample by electrical characteristic. The sample is a semiconductor. The light emitted from the light source has a smaller amount of energy than the band gap of the semiconductor.

In the scanning probe microscope according to the present invention, the light source emits light having a smaller amount of energy than the band gap of the semiconductor. It is thus allowed to measure the sample by electrical characteristic and observe the shape of the sample surface simultaneously without generating photoelectric current in the semiconductor as a sample and eventually, without obstructing precise measurement of the sample by electrical characteristic.

Preferably, the sample includes silicon and the light emitted from the light source is of a wavelength larger in value than 1.107 $\mu$m.

In the scanning probe microscope according to the present invention, the light emitted from the light source is larger in value than 1.107 $\mu$m. It is thus allowed to avoid emission of light from the light source having a larger amount of energy than the band gap of silicon as a sample and eventually, generation of photoelectric current in the sample.

According to a second aspect of the present invention, the scanning probe microscope has a light source and a cantilever for detecting atomic force interaction with a sample. The scanning probe microscope induces light emitted from the light source to impinge on the cantilever and detects reflected light obtained therefrom, thus forming an image of a shape of a sample surface. The cantilever also serves as a probe for measuring the sample by electrical characteristic. The scanning probe microscope further has a light blocker for blocking the light emitted from the light sources, thus preventing the light from impinging on the cantilever during measurement of the sample by electrical characteristic.

The scanning probe microscope according to the present invention further has the light blocker for blocking the light emitted from the light source, thus preventing the light from impinging on the cantilever during measurement of the sample by electrical characteristic. As a result, there will be no photoelectric current to be generated in the sample, thus causing no obstruction to precise measurement of the sample by electrical characteristic.

According to a third aspect of the present invention, the scanning probe microscope has a probe and a cantilever for detecting atomic force interaction with a sample. The scanning probe microscope detects tunneling current flowing between the probe and the cantilever, thus forming an image of a shape of a sample surface. The cantilever also serves as a probe for measuring the sample by electrical characteristic. The cantilever includes an insulating layer defined between a side facing the probe and a side facing the sample.

The scanning probe microscope according to the present invention has no light source. Therefore, there will be no photoelectric current to be generated in the sample, thus causing no obstruction to precise measurement thereof by electrical characteristic. Further, the cantilever includes the insulating layer defined between the side facing the probe and the side facing the sample. As a result, tunneling current flowing between the probe and the cantilever will exert no influence on measurement of the sample by electrical characteristic.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

The AFM according to the first preferred embodiment of the present invention utilizes a light source for emitting light having a smaller amount of energy than the band gap of the semiconductor used as a sample. It is thus allowed to measure the sample by electrical characteristic and observe the shape of a sample surface simultaneously without generating photoelectric current in the semiconductor sample and eventually, without obstructing precise measurement of the sample by electrical characteristic.

Figure 1:
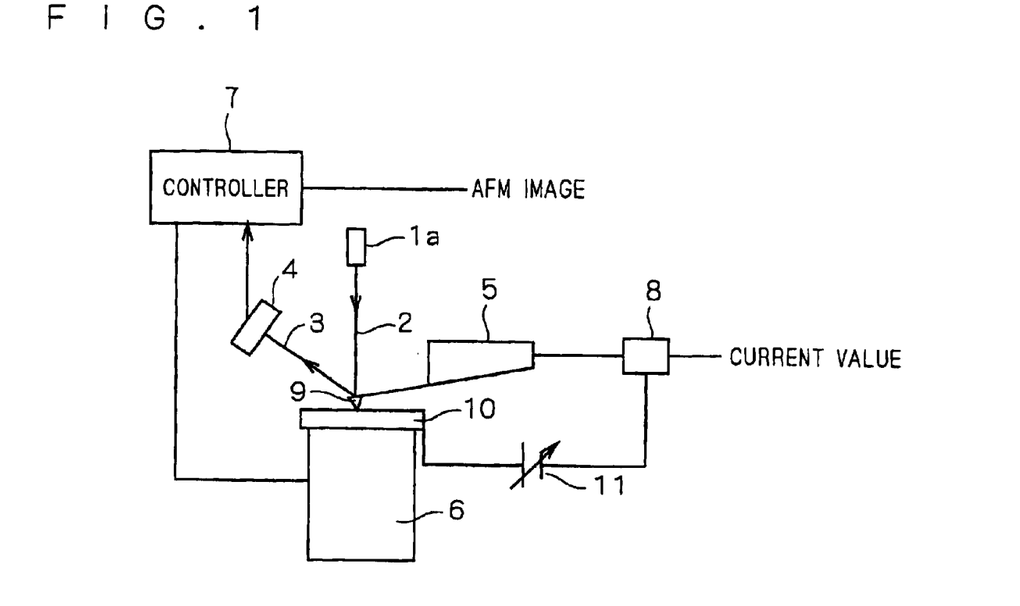
FIG. 1 is a diagram illustrating an AFM according to a first preferred embodiment of the present invention.

FIG. 1 is a diagram illustrating the AFM according to the first preferred embodiment. In FIG. 1, sections serving the same functions as those in the AFM according to FIG. 12 are designated by the same reference numerals. A sample to be observed in the first preferred embodiment is a semiconductor.

The AFM according to the first preferred embodiment includes a laser diode 1a for emitting light having a smaller amount of energy than the band gap of the semiconductor sample. More particularly, the laser light 2 emitted from the laser diode 1a should be of a wavelength larger in value than a wavelength $\lambda$ calculated as follows:

$$\lambda = hc/Eg$$

where h is Planck's constant, c represents speed of light and Eg represents band gap.

When the semiconductor sample is silicon, the band gap thereof is 1.12 eV, thus calculating the wavelength λ at 1.107 μm. In this case, the laser diode 1a should be such that the laser light 2 emitted therefrom is of a wavelength larger in value than λ. It is therefore allowed to avoid emission of light from the laser diode 1a having a larger amount of energy than the band gap of silicon as a sample and eventually, avoid generation of photoelectric current in the sample.

The configuration of the AFM according to the first preferred embodiment is the same as of the AFM in FIG. 12 in the other respects and therefore, the description thereof is omitted.

The AFM according to the first preferred embodiment utilizes the laser diode 1a as a light source for emitting light having a smaller amount of energy than the band gap of the semiconductor sample. It is thus allowed to measure the sample by electrical characteristic and observe the shape of the sample surface simultaneously without generating photoelectric current in the semiconductor sample and eventually, without obstructing precise measurement of the sample by electrical characteristic.

Except for the light source, the AFM according to the first preferred embodiment is the same in configuration as the AFM in FIG. 12. Alternatively, the first preferred embodiment may be applicable to other types of scanning probe microscopes such as an optical interaction AFM. That is, the scanning probe microscope is required to include a light source and a cantilever for detecting atomic force interaction with a sample. According to this SPM, the cantilever should also serve as a probe for measuring the sample by electrical characteristic. Light emitted from the light source is induced to impinge on the cantilever. Reflected light obtained therefrom is detected and an image of the shape of a sample surface is formed. When the sample can also be measured by electrical characteristic in this SPM, utilizing the light source that meets the foregoing requirements, the same effect as in the first preferred embodiment is also obtained.

Second Preferred Embodiment

Even when an AFM to be used is the background-art AFM introduced in FIG. 12, the method of using an AFM according to the second preferred embodiment of the present invention prevents generation of photoelectric current in a sample.

Figure 2:
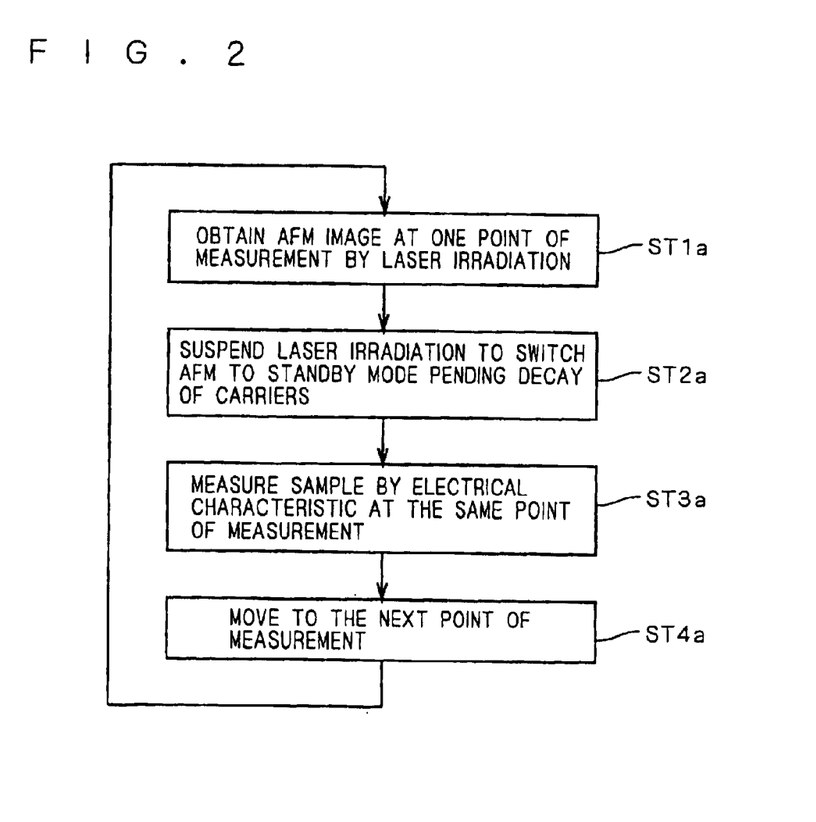
FIG. 2 is a flowchart showing a method of using an AFM according to a second preferred embodiment of the present invention.

FIG. 2 is a flowchart showing the method of using an AFM according to the second preferred embodiment. First, at a point of measurement in a measurement region, the laser light 2 emitted from the laser diode 1 is induced to impinge on the conductive cantilever 5. Then the controller 7 detects the amount of deflection of the conductive cantilever 5 and controls the piezoelectric actuator 6 in feedback control in the Z axis direction such that the amount of deflection of the conductive cantilever 5 is kept at a certain level. Utilizing the amount of deflection obtained therefrom, an AFM image is formed (step ST1a) as shown by the flowchart in FIG. 2.

Next, emission of the laser light 2 stops. The AFM is switched to a standby mode pending decay of photoelectric current to be generated in the sample due to the laser light 2. More particularly, the AFM waits for a time corresponding to decay time of carriers as the cause of photoelectric current (electron-hole pair 13 in FIG. 13) (step ST2a).

After elapse of the waiting time, the variable voltage source 11 and the amplifier 8 become operative to measure the sample by electrical characteristic at the point of measurement (step ST3a). Here, measurement by electrical characteristic is performed after elapse of the time waiting for decay of the carriers. As a result, photoelectric current that might be generated at step ST1a is to decay at the time of measurement by electrical characteristic, thus exerting no influence on measurement.

When measurement by electrical characteristic is completed at this point, the piezoelectric actuator 6 is controlled by the controller 7 to be displaced in the X and Y axis directions. Then the stage 10 moves to the next point of measurement (step ST4a). Thereafter the next point undergoes processings of steps ST1a through ST3a. Steps ST1a through ST4a are repeated until measurement is completed on the whole area of the measurement region.

Figure 3:
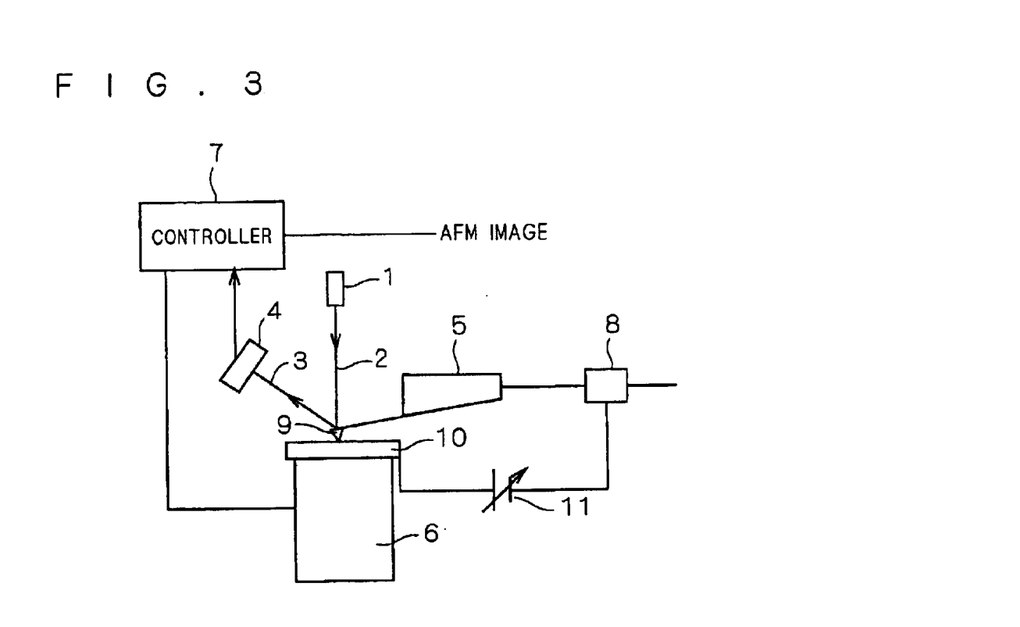
FIG. 3 is a diagram illustrating how an AFM operates during formation of an AFM image in the method of using an AFM according to the second preferred embodiment of the present invention.
Figure 4:
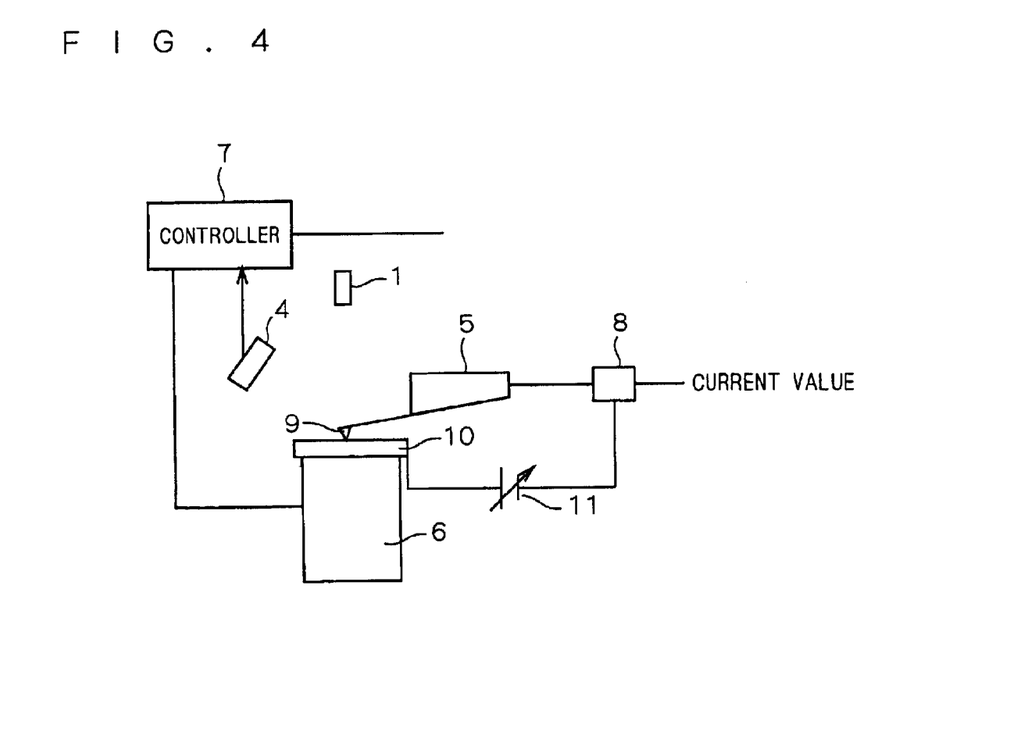
FIG. 4 is a diagram illustrating how an AFM operates during measurement of an electrical characteristic in the method of using an AFM according to the second preferred embodiment of the present invention.

FIGS. 3 and 4 are diagrams illustrating how the AFM operates during steps ST1a and ST3a, respectively. The AFM does not perform a measurement of the sample by electrical characteristic in FIG. 3 and therefore, there is no current value to be outputted from the amplifier 8. Further, the AFM does not form an AFM image in FIG. 4 and therefore, there is no laser light 2 to be emitted from the laser diode 1 and eventually, no AFM image to be outputted from the controller 7.

According to the method of using the AFM of the second preferred embodiment, the sample is measured by electrical characteristic at least after the decay time of photoelectric current in the sample has elapsed. As a result, there will be no photoelectric current during measurement of the sample by electrical characteristic, thus causing no obstruction to precise measurement thereof.

According to the method of using the AFM of the second preferred embodiment, further, formation of the AFM image, switching to a standby mode waiting for elapse of the decay time of photoelectric current and measurement of the sample by electrical characteristic are performed at each point of measurement. After image formation and measurement by electrical characteristic are completed at one point of measurement, the stage 10 moves to the next point where these steps are repeated. Therefore, an AFM image is formed at each point of measurement and electrical characteristic is obtained in situ. As a result, image formation of the shape of the sample surface and measurement thereof by electrical characteristic are allowed with a high degree of precision The method of using the AFM according to the second preferred embodiment uses the AFM in the background art illustrated in FIG. 12. Alternatively, the second preferred embodiment may be applicable to another type of scanning probe microscope such as an optical interaction AFM. That is, the scanning probe microscope is required to include a light source and a cantilever for detecting atomic force interaction with a sample. According to this SPM, the cantilever should also serve as a probe for measuring the sample by electrical characteristic. Light emitted from the light source is induced to impinge on the cantilever. Reflected light obtained therefrom is detected and an image of the shape of a sample surface is formed. When the sample can also be measured by electrical characteristic in this SPM, following the foregoing method, the same effect as in the second preferred embodiment is also obtained.

Third Preferred Embodiment

The third preferred embodiment of the present invention is a modification of the method of using the AFM according to the second preferred embodiment. In contrast to the second preferred embodiment requiring formation of an AFM image, switching to a standby mode waiting for elapse of decay time of photoelectric current and measurement of a sample by electrical characteristic to be performed at each point of measurement, the third preferred embodiment requires these steps to be performed at each line of measurement.

Figure 5:
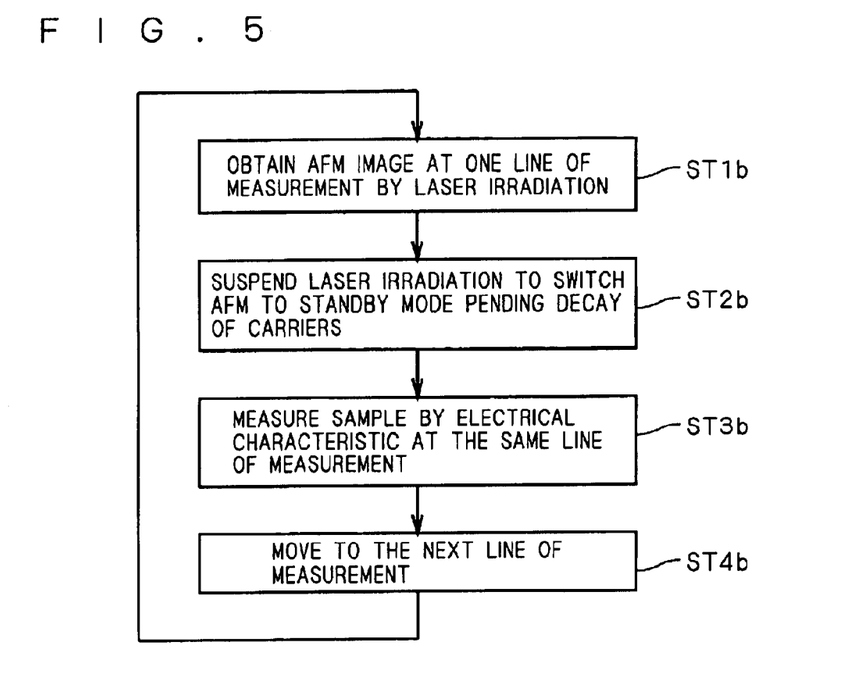
FIG. 5 is a flowchart showing a method of using an AFM according to a third preferred embodiment of the present invention.

FIG. 5 is a flowchart showing the method of using the AFM according to the third preferred embodiment. First, at a point of measurement in a measurement region, the laser light 2 emitted from the laser diode 1 is induced to impinge on the conductive cantilever 5. Then the controller 7 detects the amount of deflection of the conductive cantilever 5 and controls the piezoelectric actuator 6 in feedback control in the Z axis direction such that the amount of deflection of the conductive cantilever 5 is kept at a certain level. Utilizing the amount of deflection obtained therefrom, an AFM image is formed. These operations for forming the AFM image are sequentially performed along a line of measurement either in the X direction or Y direction (step ST1*b*) as shown by the flowchart in FIG. 5.

Next, emission of the laser light 2 stops. The AFM is switched to a standby mode pending decay of photoelectric current generated in the sample due to the laser light 2. More particularly, the AFM waits for a time corresponding to decay time of carriers as the cause of photoelectric current (step ST2*b*). At this time, the probe 9 of the conductive cantilever 5 returns to the initial point of measurement where formation of the AFM image starts.

After elapse of the waiting time, the variable voltage source 11 and the amplifier 8 become operative to measure the sample by electrical characteristic covering the line of measurement starting from the above initial point (step ST3*b*). Here, measurement by electrical characteristic is performed after elapse of the time waiting for decay of the carriers. As a result, photoelectric current that might be generated at step ST1*b* is to decay at the time of measurement by electrical characteristic, thus exerting no influence on measurement.

When measurement by electrical characteristic is completed at this line of measurement, the piezoelectric actuator 6 is controlled by the controller 7 to be displaced in the X and Y axis directions. Then the stage 10 moves to the next line of measurement (step ST4*b*). Thereafter the next line undergoes processings of steps ST1*b* through ST3*b*. Steps ST1*b* through ST4*b* are repeated until measurement is completed on the whole area of the measurement region.

According to the method of using the AFM of the third preferred embodiment, formation of the AFM image, switching to a standby mode waiting for elapse of the decay time of photoelectric current and measurement of the sample by electrical characteristic are performed at each line of measurement. After image formation and measurement by electrical characteristic are completed at one line of measurement, the stage 10 moves to the next line where these steps are repeated. Therefore, while expediting image formation of the shape of the sample surface and measurement thereof by electrical characteristic with a high degree of precision, the AFM is switched to a standby mode for each line. As a result, the method according to the third preferred embodiment realizes observation at a higher speed than the second preferred embodiment.

Similar to the second preferred embodiment, the third preferred embodiment may be applicable to other types of scanning probe microscopes as well as to the AFM in FIG. 12.

Fourth Preferred Embodiment

The fourth preferred embodiment of the present invention is another modification of the method according to the second preferred embodiment. In contrast to the second preferred embodiment requiring formation of an AFM image, switching to a standby mode waiting for elapse of decay time of photoelectric current and measurement of a sample by electrical characteristic to be performed at each point of measurement, the fourth preferred embodiment requires these steps to be each performed throughout the whole area of a measurement region.

Figure 6:
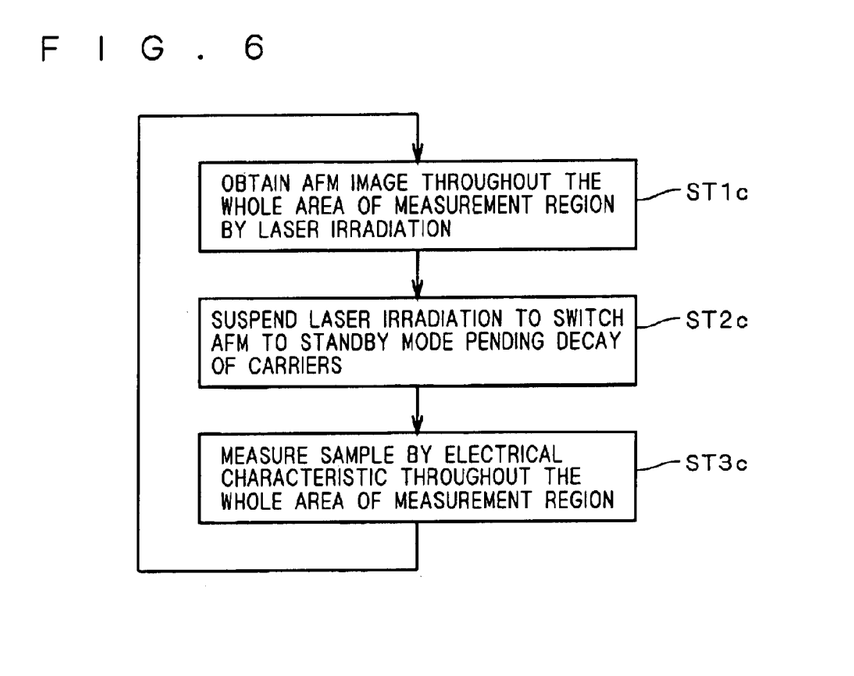
FIG. 6 is a flowchart showing a method of using an AFM according to a fourth preferred embodiment of the present invention.

FIG. 6 is a flowchart showing the method of using an AFM according to the fourth preferred embodiment. First, at a point of measurement in the measurement region, the laser light 2 emitted from the laser diode 1 is induced to impinge on the conductive cantilever 5. Then the controller 7 detects the amount of deflection of the conductive cantilever 5 and controls the piezoelectric actuator 6 in feedback control in the Z axis direction such that the amount of deflection of the conductive cantilever 5 is kept at a certain level. Utilizing the amount of deflection obtained therefrom, an AFM image is formed. These operations for forming the AFM image are sequentially performed throughout the whole area of the measurement region (step ST1*c*) as shown by the flowchart in FIG. 6.

Next, emission of the laser light 2 stops. The AFM is switched to a standby mode pending decay of photoelectric current to be generated in the sample due to the laser light 2. More particularly, the AFM waits for a time corresponding to decay time of carriers as the cause of photoelectric current (step ST2*c*). At this time, the probe 9 of the conductive cantilever 5 returns to the initial point of measurement where formation of the AFM image starts.

After elapse of the waiting time, the variable voltage source 11 and the amplifier 8 become operative to measure the sample by electrical characteristic covering the whole area of the measurement region starting from the above initial point (step ST3*c*). Here, measurement by electrical characteristic is performed after elapse of the time waiting for decay of the carriers. As a result, photoelectric current that might be generated at step ST1*c* is to decay at the time of measurement by electrical characteristic, thus exerting no influence on measurement.

According to the method of using the AFM of the fourth preferred embodiment, formation of the AFM image is performed throughout the whole area of the measurement region of the sample, followed by switching to a standby mode waiting for elapse of decay time of photoelectric current. The sample is thereafter measured by electrical characteristic covering the whole area of the measurement region thereof. As a result, the method according to the fourth preferred embodiment realizes observation at a higher speed than the third preferred embodiment.

Similar to the second preferred embodiment, the fourth preferred embodiment may be applicable to other types of scanning probe microscopes as well as to the AFM in FIG. 12.

Fifth Preferred Embodiment

According to the AFM of the fifth preferred embodiment of the present invention, a light blocker is added to the structure of the background-art AFM introduced in FIG. 12. According to the light blocker of the fifth preferred embodiment, the laser light 2 emitted from the laser diode 1 is blocked so that there occurs no impingement thereof on the conductive cantilever 5 during measurement of a sample by electrical characteristic.

Figure 7:
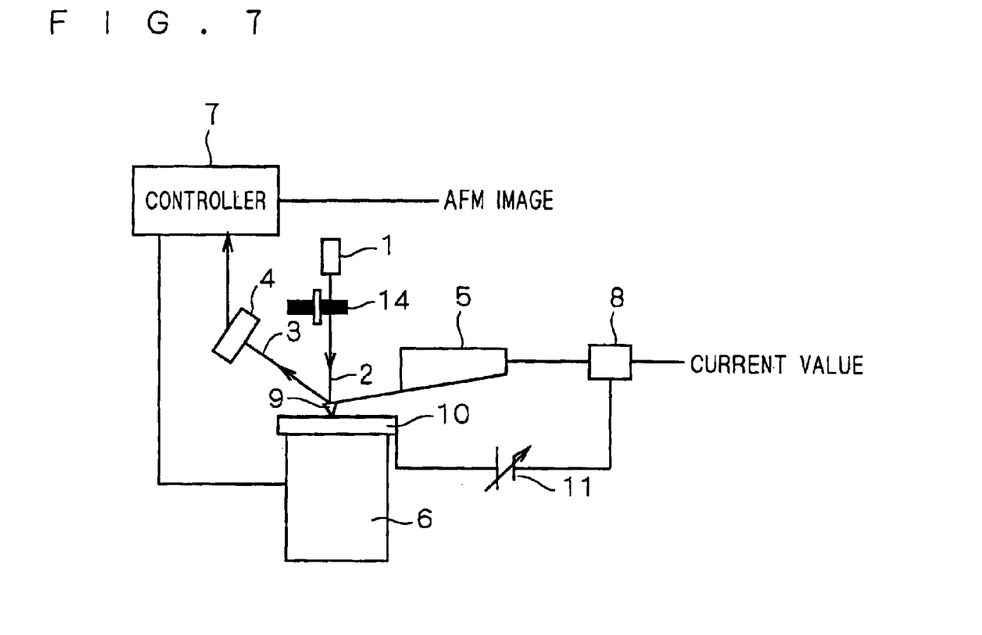
FIG. 7 is a diagram illustrating an AFM according to a fifth preferred embodiment of the present invention.

FIG. 7 is a diagram illustrating the AFM according to the fifth preferred embodiment. In FIG. 7, sections serving the same functions as those in the AFM according to FIG. 12 are designated by the same reference numerals. The AFM according to the fifth preferred embodiment includes the light chopper 14 as a light blocker for blocking the laser light 2 so that there occurs no impingement thereof on the conductive cantilever 5 during measurement of the sample by electrical characteristic.

Figure 8:
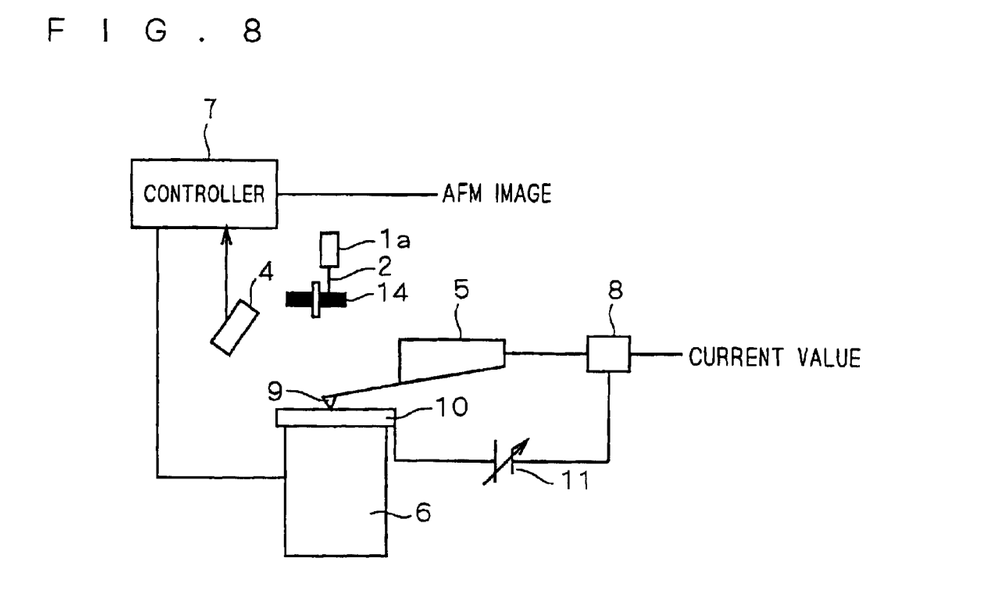
FIG. 8 is a diagram illustrating how the AFM according to the fifth preferred embodiment of the present invention operates when a light chopper 14 is in an operating state.
Figure 9:
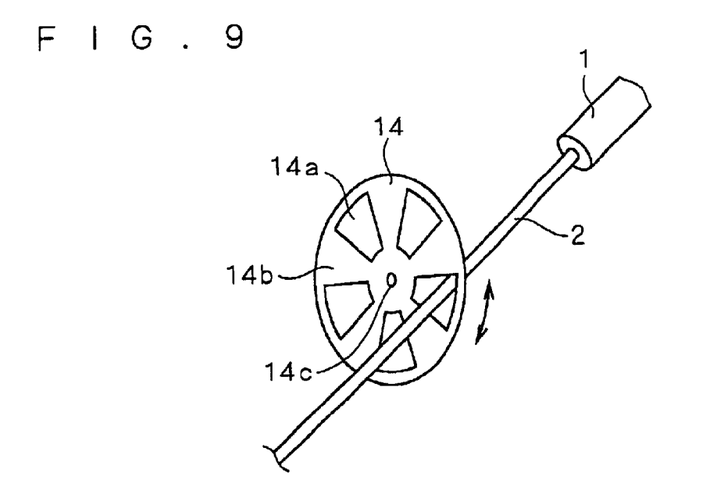
FIG. 9 is a diagram illustrating the structure of the light chopper 14 employed in the AFM according to the fifth preferred embodiment of the present invention.

FIG. 8 is a diagram illustrating how the AFM operates when the light chopper 14 is in operating state. FIG. 9 is a diagram illustrating the structure of the light chopper 14.

As illustrated in FIG. 9, the light chopper 14 has a portion 14*a* for allowing light to pass through and a portion 14*b* for blocking light. The portions 14*a* and 14*b* are arranged in a radial pattern originating in an axis of rotation 14c. The light chopper 14 is rotated about the axis of rotation 14c, thus determining whether the laser light 2 should be allowed to pass through the portion 14a or it should be blocked by the portion 14b.

The configuration of the AFM according to the fifth preferred embodiment is the same as the AFM in FIG. 12 in the other respects and therefore, the description thereof is omitted.

According to the AFM of the fifth preferred embodiment, the light chopper 14 is further provided for blocking the laser light 2 so that there occurs no impingement thereof on the conductive cantilever 5 during measurement of the sample by electrical characteristic. As a result, there will be no photoelectric current to be generated in the sample, thus causing no obstruction to precise measurement of the sample by electrical characteristic.

Similar to the first preferred embodiment, the fifth preferred embodiment may be applicable to other types of scanning probe microscopes as well as to the AFM in FIG. 12.

Sixth Preferred Embodiment

The AFM according to the sixth preferred embodiment of the present invention utilizes the advanced STM method including an STM probe and a conductive cantilever for detecting atomic force interaction. The conductive cantilever has an insulating layer interposed therein. According to the AFM of the sixth preferred embodiment, tunneling current flowing between the STM probe and the conductive cantilever is measured, thereby forming an image of the shape of a sample surface.

Figure 10:
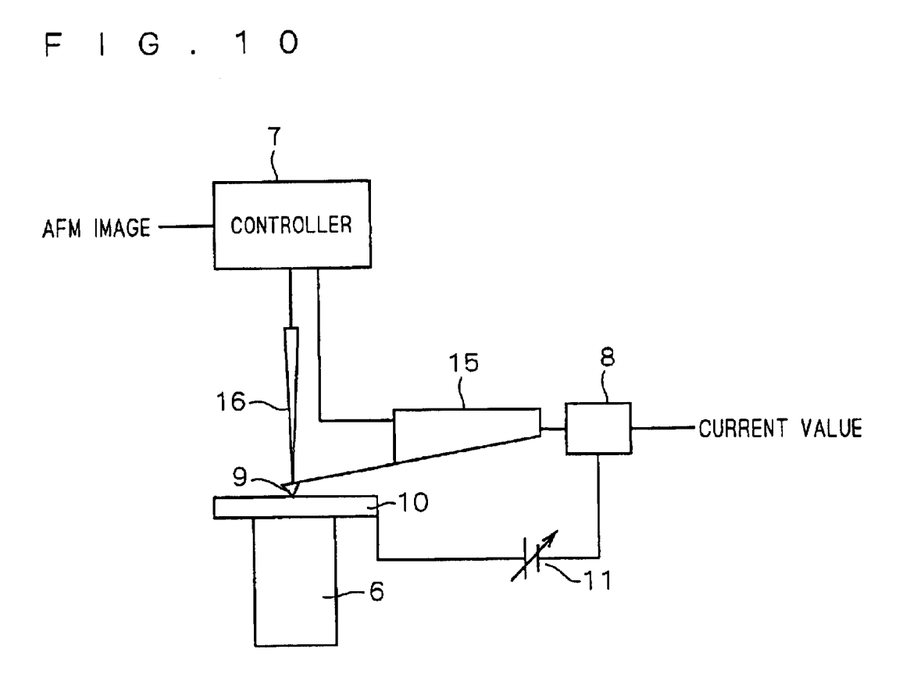
FIG. 10 is a diagram illustrating an AFM according to a sixth preferred embodiment of the present invention.
Figure 11:
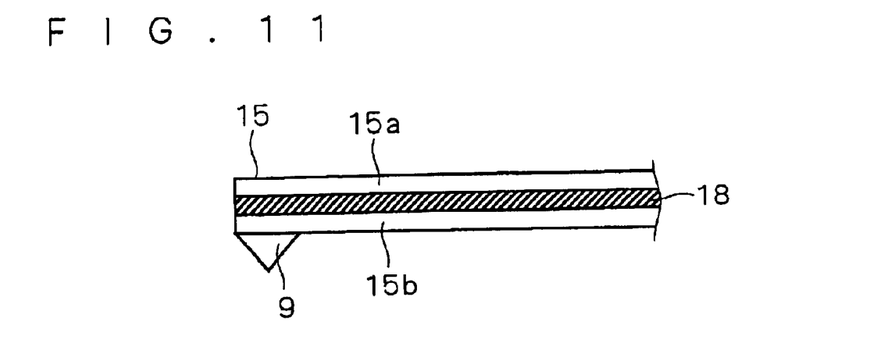
FIG. 11 is a diagram illustrating the structure of a conductive cantilever 15 employed in the AFM according to the sixth preferred embodiment of the present invention.

FIG. 10 is a diagram illustrating the AFM according to the sixth preferred embodiment. In FIG. 10, sections serving the same functions as those in the AFM according to FIG. 12 are designated by the same reference numerals. Instead of the laser diode 1 and the photodetector 4, the AFM according to the sixth preferred embodiment includes a probe 16 for detecting tunneling current. Utilizing the probe 16, an AFM image is formed and the piezoelectric actuator 6 is controlled in feedback control. Additionally, the conductive cantilever 5 is replaced by the conductive cantilever 15. As illustrated in FIG. 11, the conductive cantilever 15 includes an insulating layer 18 defined between a side 15a facing the probe 16 and a side 15b facing the sample.

In some cases, AFMs according to the background have been configured according to FIG. 10 including the conductive cantilever 5 instead of the conductive cantilever 15 yet omitting the amplifier 8 and the variable voltage source 11. The AFM of this type is the advanced STM in which atomic force interaction between the conductive cantilever 5 and the sample is detected to output the amount of deflection (displacement) of the conductive cantilever 5. The controller 7 controls the piezoelectric actuator 6 in feedback control in such a manner that the amount of tunneling current flowing between the probe 16 and the conductive cantilever 5 is kept at a certain level, thus forming an AFM image.

According to the AFM of this type using the advanced STM method, however, due to the existence of tunneling current flowing between the probe 16 and the conductive cantilever 5, it has not been allowed to measure the sample by electrical characteristic by generating current to be induced to flow between the sample and the conductive cantilever 5. Even when current is generated to flow between the sample and the conductive cantilever 5 for the sake of measurement by electrical characteristic, this current is mixed into tunneling current flowing between the probe 16 and the conductive cantilever 5. As a result, both formation of the AFM image and measurement by electrical characteristic become unsuccessful.

The AFM according to the advanced STM method includes no light source as utilized in the optical lever method and the optical interaction method. Therefore, there will be no photoelectric current to be generated in the sample, thus causing no obstruction to precise measurement thereof by electrical characteristic. In view of this, the AFM of the advanced STM method should inherently be the leading candidate for a scanning probe microscope preventing generation of photoelectric current in a sample due to laser light. Focusing attention on this, the sixth preferred embodiment is directed to the AFM developed by making further improvement to the advanced STM method in the background art, thus allowing measurement of the sample by electrical characteristic.

More particularly, utilizing the conductive cantilever 15 as illustrated in FIG. 11 including the insulating layer 18 defined between the side 15a facing the probe 16 and the side 15b facing the sample, tunneling current flowing between the probe 16 and the conductive cantilever 15, and current flowing between the sample and the conductive cantilever 15 are not mixed together.

The configuration of the AFM according to the sixth preferred embodiment is the same as of the AFM in FIG. 12 in other respects and therefore, the description thereof is omitted.

The AFM according to the advanced STM method of the sixth preferred embodiment includes no light source. Therefore, there will be no photoelectric current to be generated in the sample, thus causing no obstruction to precise measurement thereof by electrical characteristic. Further, the conductive cantilever 15 includes the insulating layer 18 defined between the side 15a facing the probe 16 and the side 15b facing the sample. As a result, tunneling current flowing between the probe 16 and the conductive cantilever 15 will exert no influence on measurement of the sample by electrical characteristic.

While the invention has been shown and described in detail, the foregoing description is in all aspects illustrative and not restrictive. It is therefore understood that numerous modifications and variations can be devised without departing from the scope of the invention.

What is claimed is:

1. A scanning probe microscope having a light source and a cantilever for detecting atomic force interaction with a sample, said scanning probe microscope inducing light emitted from said light source to impinge on said cantilever and detecting reflected light obtained therefrom, thus forming an image of a shape of a sample surface, wherein said cantilever also serves as a probe for measuring said sample by electrical characteristic, said sample includes a silicon semiconductor, and said light emitted from said light source has a smaller amount of energy than the band gap of said silicon semiconductor and is of a wavelength larger in value than 1.107 $\mu$m.

* * * * *